(12) United States Patent
Pfeffer et al.

(10) Patent No.: US 8,458,434 B2
(45) Date of Patent: Jun. 4, 2013

(54) UNIFIED VIRTUAL CONTIGUOUS MEMORY MANAGER

(75) Inventors: Zachary A. Pfeffer, San Diego, CA (US); Larry A. Bassel, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 436 days.

(21) Appl. No.: 12/844,174

(22) Filed: Jul. 27, 2010

(65) Prior Publication Data

US 2011/0225387 A1      Sep. 15, 2011

Related U.S. Application Data

(60) Provisional application No. 61/313,329, filed on Mar. 12, 2010.

(51) Int. Cl.
*G06F 12/00* (2006.01)

(52) U.S. Cl.
USPC ............... 711/203; 711/1; 711/6; 711/206; 711/207; 711/209; 711/E12.058; 711/E12.059; 711/E12.061; 711/E12.065; 711/E12.068

(58) Field of Classification Search
USPC .......... 711/1, 6, 203, 206, 207, 209, E12.058, 711/E12.059, E12.061, E12.065, E12.068
See application file for complete search history.

(56) References Cited

U.S. PATENT DOCUMENTS 8,176,282 B2 *   5/2012   Bouvier ................... 711/163

\* cited by examiner

*Primary Examiner* — Midys Rojas
(74) *Attorney, Agent, or Firm* — Neugeboren O'Dowd PC

(57) ABSTRACT

Memory management methods and computing apparatus with memory management capabilities are disclosed. One exemplary method includes mapping an address from an address space of a physically-mapped device to a first address of a common address space so as to create a first common mapping instance, and encapsulating an existing processor mapping that maps an address from an address space of a processor to a second address of the common address space to create a second common mapping instance. In addition, a third common mapping instance between an address from an address space of a memory-management-unit (MMU) device and a third address of the common address space is created, wherein the first, second, and third addresses of the common address space may be the same address or different addresses, and the first, second, and third common mapping instances may be manipulated using the same function calls.

17 Claims, 6 Drawing Sheets

UNIFIED VIRTUAL CONTIGUOUS MEMORY MANAGER

FIELD OF THE INVENTION

The present invention relates to computing devices. In particular, but not by way of limitation, the present invention relates to apparatus and methods for memory management in computing devices.

BACKGROUND OF THE INVENTION

Some computing devices (e.g., smart phones, PDAs, desktop and mobile computers, and mobile media devices) utilize a physical memory (PMEM) management API to allocate and free large buffers outside of an operating system (OS) heap. In these systems, however, attention must be paid to determine whether those buffers are virtually or physically mapped by devices, and in addition, management code must be tailored to work across different devices that may gain or lose I/O memory management units (IOMMUs). Moreover, runtime allocation of large physical buffers in prior systems is difficult if not practical. Accordingly, current systems do not always operate in a convenient manner and will most certainly not be satisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention may be characterized as a method for managing memory of a computing device. The method may include mapping an address from an address space of a physically-mapped device to a first address of a common address space so as to create a first common mapping instance that is a one-to-one mapping between the address from the address space of the physically-mapped device and the address of the common address space, and encapsulating an existing processor mapping that maps an address from an address space of a processor to a second address of the common address space to create a second common mapping instance. In addition, a third common mapping instance is created between an address from an address space of a memory-management-unit (MMU) device and a third address of the common address space, wherein the first, second, and third addresses of the common address space may be the same address or different addresses; and the first, second, and third common mapping instances may be manipulated using the same function calls.

Another embodiment may be characterized as a computing apparatus that includes physical memory, a processing device, a plurality of devices, and a bus coupled to the physical memory, the processing device and the plurality of devices. In addition, the apparatus includes a VCM create component configured to create virtual memory instances for the plurality of devices that are available to any function and a VCM create from prebuilt component configured to create a virtual memory instance from an existing virtual memory instance. A VCM associate component is configured to create an associated virtual memory instance from any selected virtual memory instance and any one of the processing device and plurality of devices that correspond to the selected virtual memory instance, and the apparatus includes a VCM activate component configured to activate the virtual memory instances. Moreover, the apparatus includes a VCM reserve component that is configured to reserve all, or portions, of any of the virtual memory instances so as to produce reservation instances, and a VCM back component is configured to create mappings between each of the reservation instances and instances that represent multiple physical memory instances that represent multiple bus addresses.

Yet another embodiment may be characterized as a non-transitory, tangible computer readable storage medium, encoded with processor readable instructions to perform a method for managing memory of a computing device. The method in this embodiment includes mapping an address from an address space of a physically-mapped device to a first address of a common address space so as to create a first common mapping instance that is a one-to-one mapping between the address from the address space of the physically-mapped device and the address of the common address space. In addition, the method includes encapsulating an existing processor mapping that maps an address from an address space of a processor to a second address of the common address space to create a second common mapping instance; creating a third common mapping instance between an address from an address space of a memory-management-unit (MMU) device and a third address of the common address space; and manipulating the first, second, and third common mapping instances using the same function calls.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
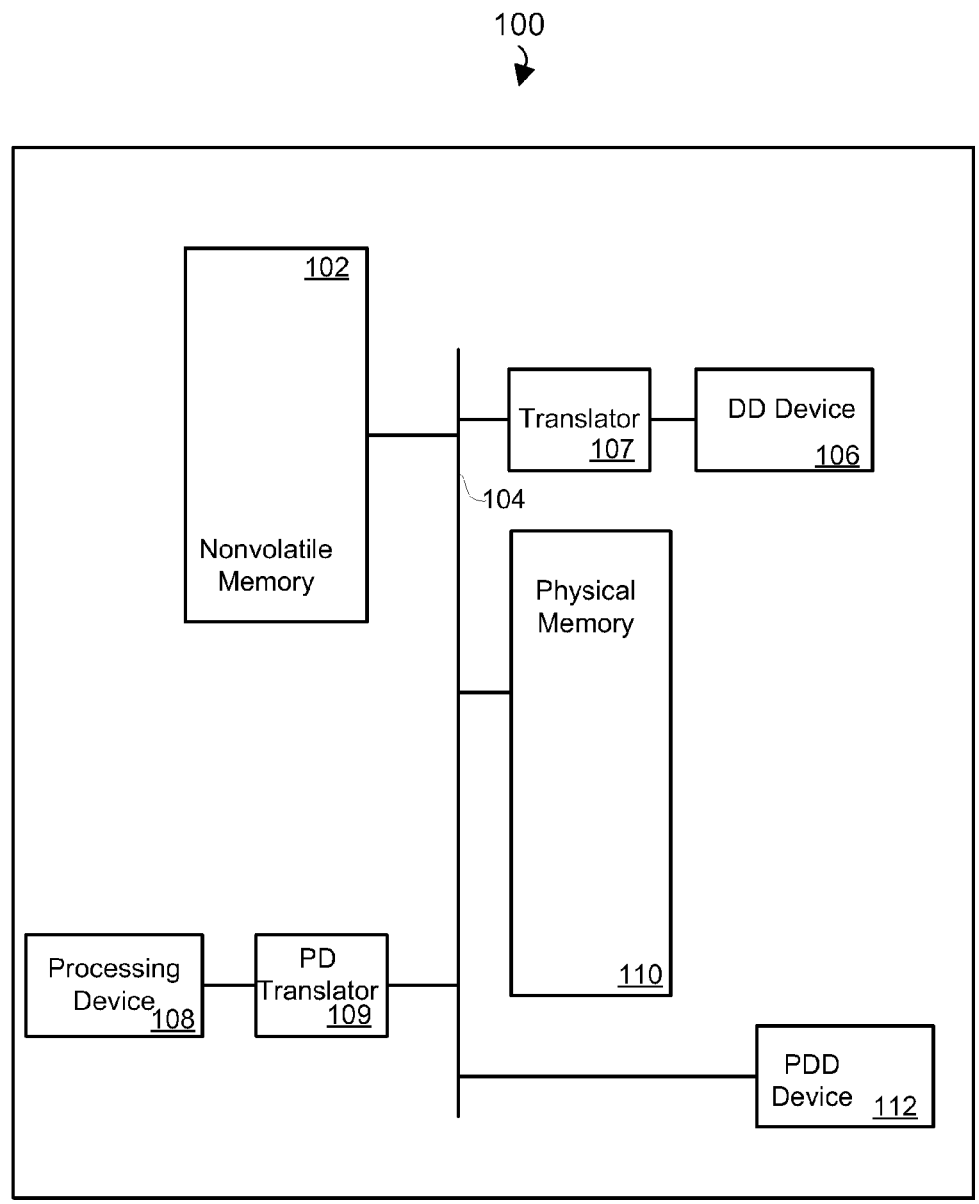
FIG. 1 illustrates a block diagram depicting physical components of an embodiment of an exemplary computing device of the present invention.

Referring first to FIG. 1, shown is a block diagram depicting physical components of an exemplary embodiment of a computing device 100. As shown, nonvolatile memory 102 is coupled to a bus 104 that is also coupled to a device-driver (DD) device 106 and a processing device 108 via corresponding translators 107, 109. In addition, a physical memory 110 and a physical-device-driver (PDD) device 112 (also referred to herein as a physically-mapped device) are also coupled to the bus 104. Although the components depicted in FIG. 1 represent physical components of the computing device 100, it is not intended to be an actual hardware diagram; thus many of the components depicted in FIG. 1 may be realized by common underlying constructs or distributed among additional physical components.

In addition, FIG. 1 represents a simplification of embodiments that may be used to realize the computing device in FIG. 1. For example, the PD device, PDD device and processing device 108 represent potentially several corresponding PD, PDD, and processing devices. Moreover, one of ordinary skill will appreciate that the computing device 100 may include many other components that are not depicted including a display, user interface, wireless communication components (e.g., wireless networking and voice communication components), optical components and associated hardware (e.g., camera/video components), and other well known and yet to be developed components.

In general, the nonvolatile memory 102 functions to store (e.g., persistently store) executable code (e.g., bootloader code, modem software, operating system code, file system code, and applications) and data (e.g., user data and media files). In many implementations the nonvolatile memory 102 is realized by flash memory, but it is certainly contemplated that other memory types may be utilized as well. Although it is possible to execute the code from the nonvolatile memory 102 in many variations of the depicted embodiment, the executable code in the nonvolatile memory 102 is typically loaded into physical memory 110 and executed by one or more processing devices (e.g., the processing device 108).

The DD device 106 (also referred to herein as an MMU-managed device) in this embodiment may be realized by variety different types of devices (e.g. IO devices) that utilize a translator. For example, the DD device 106 may be realized by one or more of a network card, PCI card, graphics card, and system-on-chip devices (SOCs). The translator 107 in many implementations is an input/output memory management unit (IOMMU), which maps device-visible virtual addresses (also called device addresses or I/O addresses in this context) to physical addresses.

The processing device 108 may be implemented by a variety of different processors including general CPUs, video processors, modem processors, digital signal processors (DSPs), graphics processing units (GPUs), and other processing components. And the processing device translator 109, in many implementations, is realized by a memory management unit (MMU), which as one of ordinary skill in the art will appreciate, handles requests by the processing component to access physical memory 110, and it also functions to facilitate virtual memory management (e.g., by translating virtual addresses to physical addresses).

The PDD device 112 is any one of a variety of devices that does not operate in connection with an IOMMU and are also referred to herein as one-to-one mapped devices or physically-mapped devices. Some examples of PDD devices may include Direct Memory Access (DMA) engines, Universal Asynchronous Receiver Transmitters (UART)s, Graphics Cards, Network devices, System-on-Chip devices, and acceleration engines.

Collectively, the nonvolatile memory 102, physical memory 110, the DD device 106, PDD device 112, and the translators 107, 109 make up a common address space. But in prior art systems, devices without IOMMUs (e.g., PDD device 112), processors with MMUs (e.g., processing device 108), and each device with an IOMMU (e.g., DD device 106), are handled using cooperating, yet distinct, subsystems—there is no unifying API.

In contrast to prior systems, several embodiments of the present invention include a virtual contiguous memory (VCM) manager, which is a unified memory manager that can handle devices with memory management units (MMUs), processors with and without MMUs, and physically-mapped devices without MMUs.

Figure 2:
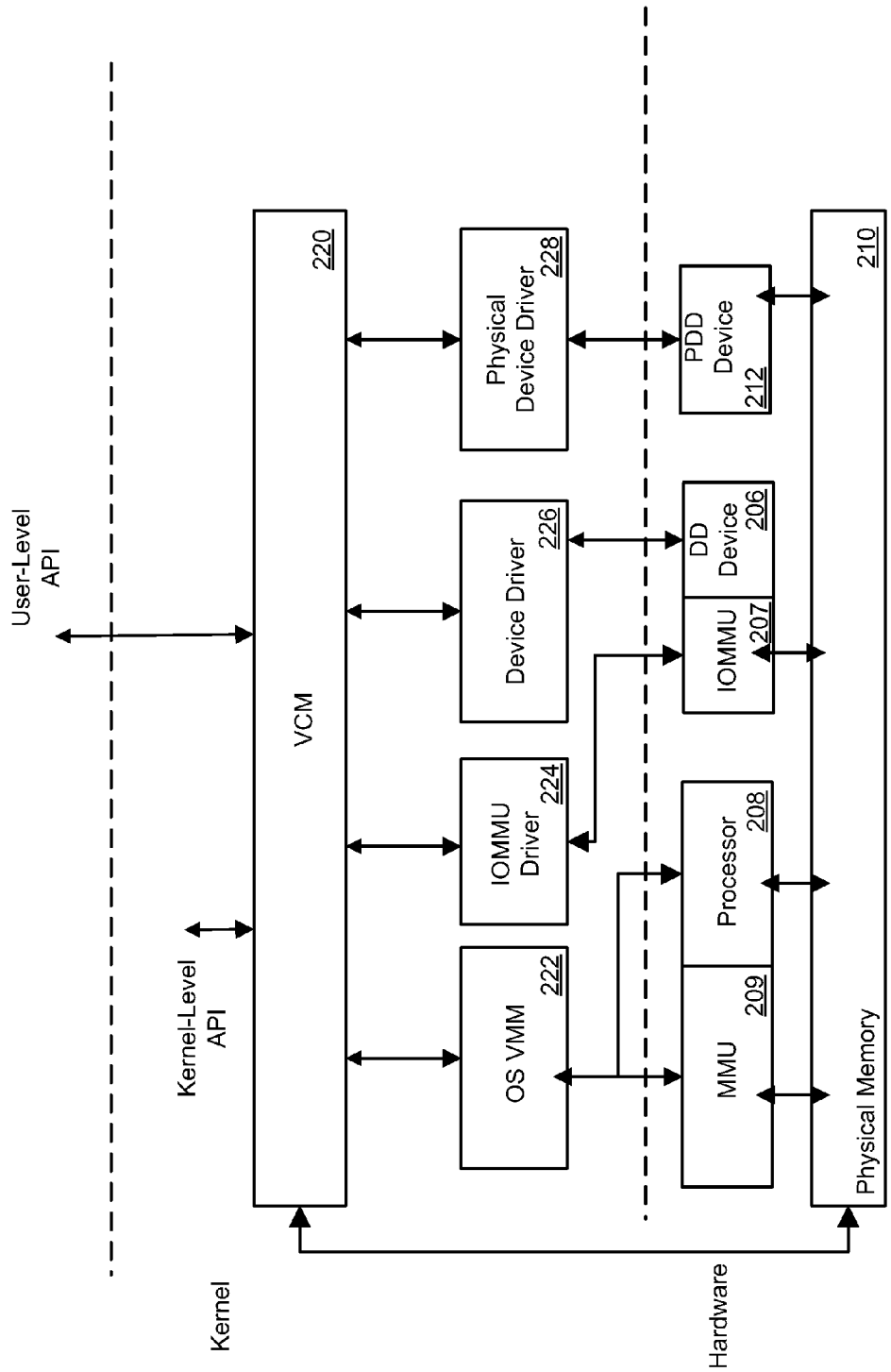
FIG. 2 is a block diagram depicting exemplary abstraction layers, from hardware to software, of the computing device described with reference to FIG. 1.

Referring to FIG. 2 for example, shown is a diagram depicting system layers according to an exemplary embodiment. As shown, a virtual contiguous memory (VCM) API 220 in this embodiment is a new kernel level service, that provides a higher-level view and common abstraction (at both the kernel-level and user-level) for separate, kernel level, subsystems that access physical memory 210, which include an OS VMM 222, an IOMMU driver 224, device driver 226, and physical device driver 228. As depicted, the OS VMM 222 provides an abstraction for an MMU 209 and processor 208; an IOMMU driver 224 provides an abstraction for an IOMMU 207; a device driver 226 provides an abstraction for a virtually-mapped, DD device 206; and a physical device driver 228 provides an abstraction for a physically-mapped, PD device 212. Beneficially, in many modes of operation, the VCM API 220 allows management of IOMMU and PMEM mapped regions without explicit low-level configuration, page-table management or address manipulation.

In operation, the VCM API 220 allows users to create and manage virtual and/or physical contiguous memory for every device in the system (including CPUs) using the same interface. In many implementations, the VCM API 220 achieves this by treating physically mapped devices (e.g., PDD devices 112, 212) as one-to-one virtually mapped devices and a light virtual memory manager overlay is utilized to encapsulate the OS VMM. Unification turns page table allocation, page table entry management and device programming into VCM region allocation, memory reservation and backing, and opaque device control.

In many embodiments for example, physically-mapped devices without MMUs (e.g., the PDD devices 112, 212) are handled by the VCM API 220 as devices that have one-to-one MMUs (e.g., the PDD devices 112, 212 are assigned a one-to-one MMU), and an abstraction is overlaid onto each the OS VMM 222 so that mappings (e.g., all mappings) are handled in one cohesive manner. Cohesion in these embodiments is achieved by regarding the virtual areas that each device (108, 208, 106, 206, 112, 212) sees as virtual contiguous memory (VCM) and all allocations from those VCM regions as reservations. Each reservation contains a place for a continuous address range in a VCM region and a discontinuous or continuous address range in a physical address space (e.g., within physical memory 210).

The VCM API 220 in the exemplary embodiment (from a user's perspective) replaces the APIs of the subsystems 222, 224, 226, 228 (which utilize disparate functions), to provide users (e.g., multimedia drivers) with PMEM and IOMMU region management using the same common API so that the explicit low-level configuration, page table management, and/or address manipulation required by prior art techniques is obviated. More specifically, many implementations of the VCM API 220 enable the following features:

1. Buffers can be allocated and freed without worrying whether those buffers are virtually (e.g., in the case of the DD device 206) or physically (e.g., in the case of the PDD device 212) mapped by devices. This allows buffer management code to work unchanged across devices that may gain or lose IOMMUs.

2. PMEM and IOMMU regions can be allocated and freed at runtime using the same physical allocator. This allows coordinated strategies to allocate and free large contiguous and discontinuous regions making runtime allocation of large physical buffers feasible.
3. Unification allows a common set of data structures, functions and error handling that can manage PMEM and IOMMU regions without translation. This allows less code churn and smart reuse of software components.
4. A unified allocation space allows PMEM and IOMMU mappings to benefit from memory migration, dynamic physical address re-mappers and symbolic physical memory targeting (using different physical memory regions to satisfy an allocation based on a single name that encapsulates each memory region).
5. PMEM and IOMMU buffer interoperation is an intrinsic feature of many implementations of the VCM API 220.

As discussed further herein, in many embodiments, each instance of an abstraction is given an opaque identification. And in general, virtual contiguous memory regions (also referred to as vcm_ids) are page table instances; reservations (also referred to as res_ids) are virtually contiguous memory allocations from a VCM region; dev_ids are device instances; avcm_ids are associated virtual contiguous memory regions that link vcm_ids to dev_ids; and physmem_ids represent physical memory. The VCM API 220 in many implementations has no dependencies on any OS or BSP feature in any kernel, and attributes of instances are obtained via functions.

Figure 3:
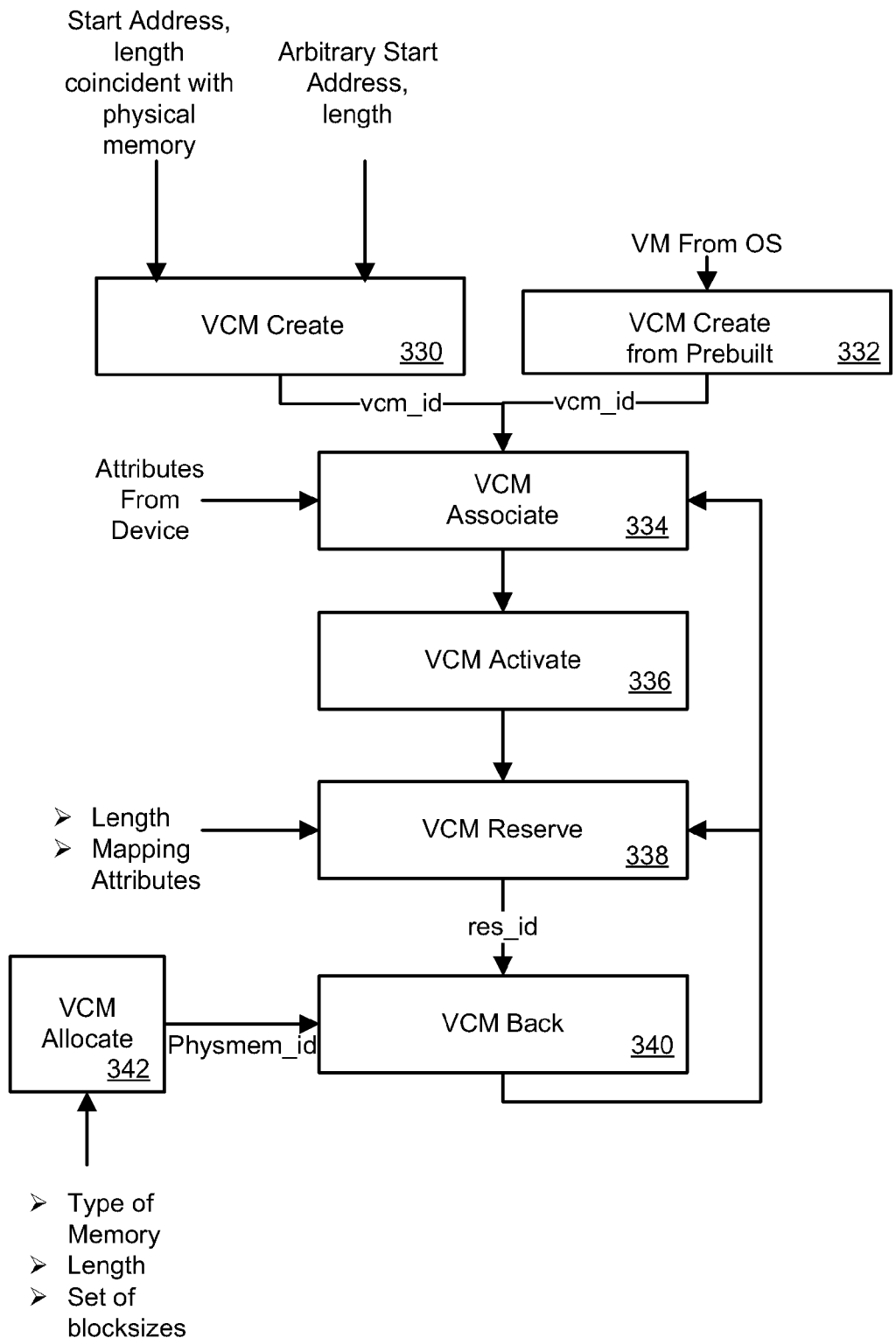
FIG. 3 is a block diagram depicting components that may be utilized to implement the VCM API described with reference to FIG. 2.

Referring next to FIG. 3, it is a block diagram depicting functional components that effectuate the VCM API 220 according to an exemplary embodiment. As shown, both a VCM create component 330 and a VCM create from prebuilt component 332 are coupled to a VCM associate component 334, which is coupled to the VCM activate component 336. And the VCM activate component 336 is coupled to the VCM reserve component 338, which is also coupled to the VCM associate component. And a VCM back component 340 is coupled to a VCM allocate 342, the VCM reserve 338, and the VCM associate 334 components.

The illustrated arrangement of these components is logical and is neither intended to be an actual hardware diagram nor a depiction of distinct software modules. Thus, the depicted components can be combined or further separated in an actual implementation. Although not required, in many embodiments, the components depicted in FIG. 3 are realized by software stored in the nonvolatile memory 102, which is executed from physical memory 110 (or nonvolatile memory) by one or more processing devices (e.g., processing device 108, 208).

While referring to FIG. 3, simultaneous reference will be made to FIG. 4, which is a flowchart depicting steps that may be traversed by the VCM components described with reference to FIG. 3. As depicted, when a computing device (e.g., computing device 100) is booted up (Block 400), its devices (including processors, MMU-managed devices, and physically-mapped devices that do not utilize IOMMUs) are identified (Block 402).

Once the devices are identified (Block 402), the VCM create component 330, enables virtual contiguous memory instances to be created in connection with both, the MMU-managed devices (e.g., PD device 106, 206) and the physically-mapped devices (e.g., PDD device 112, 212) (Block 404)

In many embodiments, to create a VCM region in connection with devices (other than processor devices)(Block 404), users call a vcm_create( ) function with the length in bytes of the requested VCM region and VCM region start address:

vcm_id=vcm_create(start_addr, len);

With respect to virtually mapped (e.g., MMU-managed) devices (e.g., device 106, 206), users may pass an arbitrary start address and length, and in the context of physically-mapped devices that are not virtually mapped (e.g., PDD device 112, 212), users pass a start address and length that is coincident with physical memory. The VCM create component 330 then returns an opaque vcm_id that represents the created VCM region, and in connection with physically-mapped devices that are not virtually mapped, the vcm_id is a one-to-one mapped VCM (the fact that it is one-to-one is hidden behind the opaque vcm_id).

In the exemplary embodiment depicted in FIG. 3, the VCM create component 330 does not associate the VCM region with any other constructs. If vcm_create( ) fails, vcm_id will be set to 0. The start_addr parameter allows the starting address to be non-zero, and all vcm_ids are unique across processors. Additional functions, which may be identified as vcm_get_start_addr( ) and vcm_get_len( ), may be utilized to return the start address and length from an existing VCM region:

start_addr=vcm_get_start_addr(vcm_id);
len=vcm_get_len(vcm_id);

In many implementations, to free a VCM region users call:
ret=vcm_free(vcm_id);
vcm_free( ) returns 0 on success and non 0 on failure.

Figure 5:
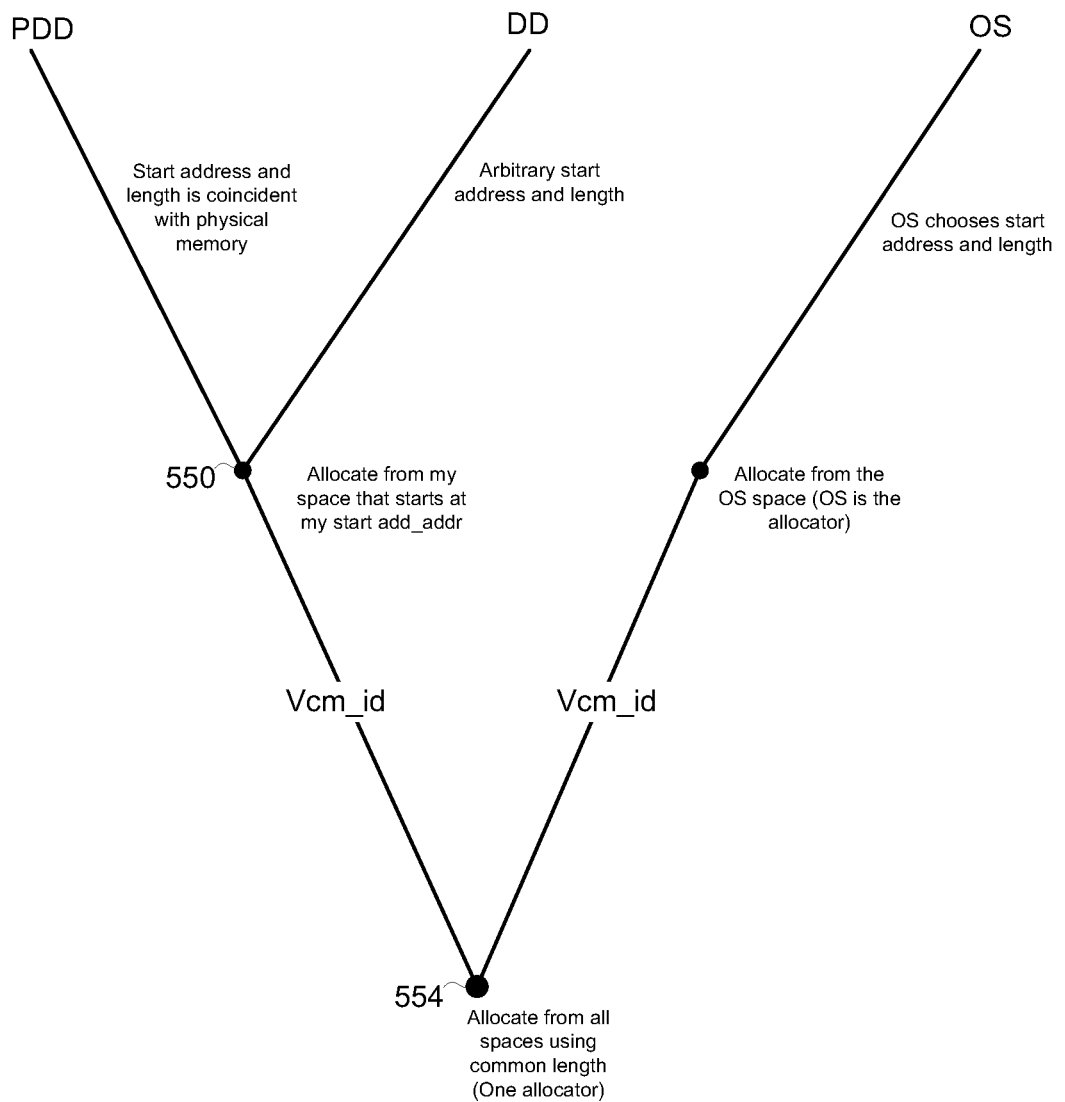
FIG. 5 is a diagram graphically depicting the abstraction and common memory allocation that embodiments of the VCM API provides.

Referring briefly to FIG. 5 it is a diagram graphically depicting the abstraction and common memory allocation that the VCM API 220 provides. As depicted at node 550, an effect of the function provided by the VCM create component 330 is a common abstraction that enables PD devices and PDD devices to be treated the same. In other words, the VCM create component 330 provides a common abstraction relative to both MMU-managed and physically-mapped devices.

Referring again to FIG. 3, the VCM create from prebuilt 332 component enables a virtual memory instance to be created from an existing virtual memory instance (e.g., managed by the OS VMM 222) (Block 406). In many implementations, to construct a VCM region from a predefined virtual memory instance (e.g., a process's page table) users call:

vcm_id=vcm_create_from_prebuilt(ext_vcm_id);

The ext_vcm_id in this embodiment is an opaque handle from an external VCM region, and as a consequence, in many implementations, freeing a VCM region (e.g., by calling vcm_free( )) that was produced with the VCM create from prebuilt component 332 has no effect. Although not required, in many implementations, the VCM create from prebuilt component 332 returns a zero on failure.

It is also contemplated that VCM regions may be cloned, for example, by calling:

new_vcm_id=vcm_clone(vcm_id);

And vcm_clone( ) returns 0 on failure. In many embodiments, the cloned VCM regions have no further association with the original VCM region. Any reservations (discussed further herein) will also be cloned.

Once VCM regions are created, the VCM associate component 334 is configured to map VCM regions (e.g., the VCM regions created by the VCM create 330 and VCM create from prebuilt 332 components) to devices (e.g., devices, 106, 108, 112) to generate associated virtual contiguous memory (AVCM) regions (Block 408). In some embodiments, to utilize the VCM associate component 334, users call:

avcm_id=vcm_assoc(vcm_id, dev_id, attr);

This function associates a vcm_id with a dev_id, and returns an opaque avcm_id to be used when this association is activated. As discussed further herein, in many embodiments, the VCM associate component 334 is configured only to associate VCM regions with devices—it does not activate the associations. A dev_id may represent a device with an IOMMU, without an IOMMU or with a MMU (a CPU). All devices are tied to particular masters; the topology is created during boot. avcm_id is set to 0 on error.

As depicted in FIG. 3, the VCM associate component 334 receives attribute information from the devices, and in many implementations, the attribute information (referred to as attr in the exemplary function call) may include:

TABLE 1 vcm_assoc( ) attr parameters

| Attribute | Description |
|---|---|
| VCM_USE_LOW_BASE | Use the low base register. |
| VCM_USE_HIGH_BASE | Use the high base register. |
| A 5 bit field that defines the high/low split. | This value defines the number of 0's left filled into the split register. Addresses that have the same number of 0s in the same place will use VCM_USE_LOW_BASE otherwise they'll use VCM_USE_HIGH_BASE. An all 0's value directs all translations to VCM_USE_LOW_BASE. |

To deassociate users call vcm_deassoc( ):
ret=vcm_deassoc(avcm_id);
This function returns 0 on success and non 0 on failure.
To get and set the attr's from an avcm_id users call:
ret=vcm_set_dev_attr(avcm_id, attr);
attr=vcm_get_dev_attr(avcm_id);
vcm_set_dev_attr( ) returns 0 on success and non 0 on failure.
vcm_get_dev_attr( ) returns the attr on success and 0 on failure.

The VCM activate component 336 is generally configured to activate and deactivate the mappings generated by the VCM associate 334 component (Block 410). In many implementations, to activate and deactivate the ACVMs, users call vcm_activate( ) and vcm_deactivate( ):
ret=vcm_activate(avcm_id);
ret=vcm_deactivate(avcm_id);
These functions activate and deactivate mappings by programming the location of the underlying table of virtual to physical address mappings into the device. This table will typically be called a page table. The page table's location is programmed by writing the address that it starts at into a location typically called the page table base register. In many embodiments, the VCM activate component 336 is configured so that if vcm_activate( ) is called twice and the target page table base register encapsulated in the opaque avcm_id of the second call matches that of the first, the second call's activation will go through, overwriting the first activation. These calls return 0 on success and non 0 on failure. These functions are called on vcm_ids from vcm_ext_ids. When these functions are called on vcm_ids from vcm_ext_ids the association is marked active, but no register programming is performed.

It is contemplated that a user will typically have multiple "low base" avcm_id's that they will want to switch in when needed and only one "high base" avcm_id, and vcm_activate( ) allows users to switch between them. In addition, in many implementations, the user can call vcm_is_active( ) to query if an avcm_id has been activated:
ret=vcm_is_active(avcm_id);
As discussed above, the creation of VCM regions (Blocks 404, 406), the association of the VCM regions and devices (Block 408), and the activation of the AVCMs (Block 410) does not allocate physical memory. To allocate physical memory, the VCM reserve component 338 and the VCM back component 340 are utilized in connection with the VCM allocate component 342, which may be utilized by the following three calls: vcm_reserve( ) vcm_back( ) and vcm_phys_alloc( ).

With respect to the VCM reserve component 338, it is generally configured to reserve contiguous regions from the previously created VCMs (Block 412) to create reservation instances, and it may be accessed by the following call:
res_id=vcm_reserve(vcm_id, len, attr);
The vcm_id identifies the previously created VCM, and len is the length of the request, which can be up to the length of the VCM that the reservation is being created from. In many embodiments, len is rounded up to a page boundary, and because this boundary is defined during reservation, it may vary. The VCM reserve component 338 in the embodiment described with reference to FIG. 3 does not back the reservation or allocate the actual physical memory, and in addition, the amount of space reserved in a VCM region may be greater than the physical amount of memory.

The attr can be:

TABLE 2 vcm_reserve( ) attr parameters

| Attribute | Description |
|---|---|
| VCM_SET_READ | Specifies that the reservation can be read. |
| VCM_SET_WRITE | Specifies that the reservation can be written. |
| VCM_SET_EXECUTE | Specifies that the reservation can be executed. |
| VCM_SET_USER | Specifies that this reservation is used for userspace access. |
| VCM_SET_SUPERVISOR | Specifies that this reservation is used for supervisor access. |
| VCM_SET_SECURE | Specifies that the target of the reservation is secure. |
| Caching behavior as a 4 bit field. Valid values are 0-9. | |
| VCM_NOTCACHED = 0 | The VCM region is not cached. |
| VCM_INNER_WB_WA = 1 | The VCM region is inner cached and is write-back and write-allocate. |
| VCM_INNER_WT_NWA = 2 | The VCM region is inner cached and is write-through and no-write-allocate. |
| VCM_INNER_WB_NWA = 3 | The VCM region is inner cached and is write-back and no-write-allocate. |
| VCM_OUTER_WB_WA = 4 | The VCM region is outer cached and is write-back and write-allocate. |
| VCM_OUTER_WT_NWA = 5 | The VCM region is outer cached and is write-through and no-write-allocate. |
| VCM_OUTER_WB_NWA = 6 | The VCM region is outer cached and is write-back and no-write-allocate. |
| VCM_WB_WA = 7 | The VCM region is cached and is write-back and write-allocate. |
| VCM_WT_NWA = 8 | The VCM region is cached and is write-through and no-write-allocate. |
| VCM_WB_NWA = 9 | The VCM region is cached and is write-back and no-write-allocate. |

These attributes can be set at runtime for a given res_id with vcm_set_res_attr( ) and can be read using vcm_get_res_attr( ):
ret=vcm_set_res_attr(res_id, attr);
attr=vcm_get_res_attr(res_id);
The vcm_set_res_attr( ) call returns 0 on success and non 0 on failure, and vcm_get_res_attr( ) returns the attr on success and 0 on failure.

The VCM reserve component 338 reserves memory from a VCM region instance that is opaquely passed as vcm_id. It should be recognized that even though a VCM region has not been associated with a device, memory can still be reserved from the VCM region. The VCM reserve function reserves len bytes from a vcm_id, updates the VCM region allocated via vcm_create( ) and returns an opaque reservation identification (e.g., res_id) for later use.

To return the minimum page size users call vcm_get_min_page_size( ):
    min_size=vcm_get_min_page_size( );
    min_size is 0 on failure.

To reserve memory at the very beginning of a VCM region, users call vcm_reserve_at( ):
    res_id=vcm_reserve_at(memtarget, vcm_id, len, attr);
where memtarget is (and in many implementations, can only be) VCM_START. This function will only work for virtual VCM regions and it will only work if it is the first reservation. The res_ids from vcm_reaserve_at( ) are handled the same as those produced by vcm_reserve( ). This function returns 0 on failure.

To unreserve users call vcm_unreserve( ):
    ret=vcm_unreserve(res_id);
vcm_unreserve( ) returns 0 on success and non 0 on a failure to unreserve. A failure to unreserve may be caused by trying to unreserve a backed reservation.

To return every reservation for a given VCM region users call vcm_get_next_res( ) shown here:
    res_id=vcm_get_next_res(vcm_id, res_id);
Users pass a res_id of 0 to start the traverse. vcm_get_num_res( ) returns the number of reservations:
    num_res=vcm_get_num_res(vcm_id);

Get the VCM from a reservation, the len of a reservation, and set and get the attributes of a reservation
    vcm_get_vcm_from_res( ), vcm_get_res_len( ), vcm_set_res_attr( ) and
    vcm_get_res_attr( ):
    vcm_id=vcm_get_vcm_from_res(res_id);
    len=vcm_get_res_len(res_id);
    ret=vcm_set_res_attr(res_id, attr);
    attr=vcm_get_res_attr(res_id);

To copy data from one region mapped by a res_id to another users call vcm_reserve_copy( ):
    ret=vcm_res_copy(to, to_off, from, from_off, len);
vcm_res_copy( ) takes a 'to' copy to, a 'from' to copy from, offsets in each, to_off and from_off and a len to copy. This function returns the number of bytes copied. This function allows users to copy the data from one res_id to another without worrying about whether the physical backing is discontinuous for either res_id (since res_id's are always virtually contiguous).

Figure 4:
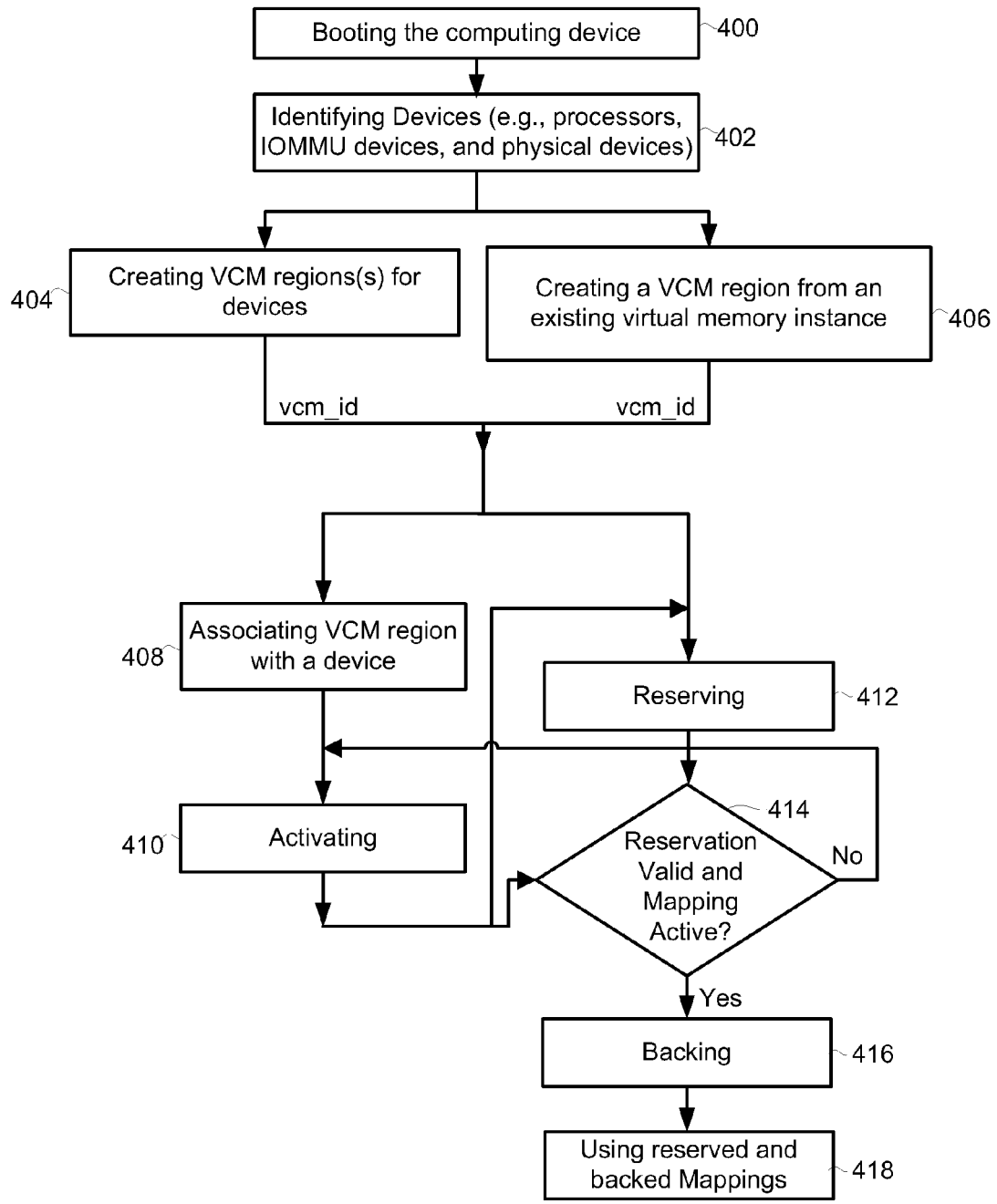
FIG. 4 is a flowchart depicting steps that may be traversed by the VCM components described with reference to FIG. 3.

As depicted in FIG. 4, if a reservation is valid, and the mapping is active (the VCM has been activated) (Block 414) (e.g., an AVCM region has been activated), the reservation may be backed (Block 416), and then used (e.g., by user level or OS level clients) (Block 418). In the exemplary embodiment depicted in FIG. 3, the VCM back component 340 in connection with the VCM allocate component 342 enables physical memory to be allocated, and physical memory is allocated as a separate step from the reservation of memory. As a consequence, multiple reservations may back the same physical memory.

With respect to the VCM back component 340, in this embodiment it is configured to link a reservation with physical memory. In some implementations, users may call the exemplary vcm_back( ) function, as follows:
    ret=vcm_back(res_id, physmem_id);
To un-link memory users call:
    ret=vcm_unback(res_id);
vcm_unback( ) returns 0 on success and non 0 on failure.

As shown in FIG. 3, the VCM allocate component 342 allocates the physical memory that the VCM back component 340 links to a reservation. In some implementations a user may call:
    physmem_id=vcm_phys_alloc(memtype, len, attr);
This function allocates physical memory. The implementation will typically construct a list of 1 MB, 64 KB and 4 KB pages that may or may not be contiguous, and the attr can be:

TABLE 3 vcm_phys_alloc( ) attr parameter.

| Attribute | Description |
| --- | --- |
| Alignment as a power of 2. 5 bit field. Valid values are >= 12 (4 KB). 12 = 4 KB, 13 = 8 KB ,etc... | Specifies that the reservation should have the alignment specified. |
| VCM_4 KB | Specifies that the reservation should use 4 KB pages. |
| VCM_64 KB | Specifies that the reservation should use 64 KB pages. |
| VCM_1 MB | Specifies that the reservation should use 1 MB pages. |
| VCM_ALL | Specifies that the reservation should use all available page sizes. |
| VCM_PHYS_CONT | Specifies that a reservation should be backed with physically contiguous memory. |
| VCM_COHERENT | Specifies that the reservation must be kept coherent because its shared. |

To free physical memory the user calls vcm_phys_free( ):
    ret=vcm_phys_free(physmem_id);
    vcm_get_memtype_of_physalloc( ) can be called to get the memtype of an existing physical allocation:
    memtype=vcm_get_memtype_of_physalloc(physmem_id);

Referring again to FIG. 5, as depicted at node 554, once the VCM regions associated with processing devices, PD devices, and PDD devices are activated (Block 410), reserved (Block 412), and backed (Block 416), a common allocation may be used and the mapping for all devices may be carried out the same way. In other words, an abstraction of attributes of three different classes of mappings is effectuated and may be accessed by a single API (e.g., the VCM API 220).

Memory Types

A memory type, which may be specified as VCM_MEM-TYPE0,1, . . . is a platform agnostic way of specifying the actual memory that will be used to back the request. This could be a bank of RAM, an on-chip memory, device memory or multiple memories. By using general identifications these memory targets are given a level of indirection that helps portability.

VCM Region Sharing

To share mappings users use vcm_reserve( ), vcm_back( ) and vcm_phys_alloc( ). An example is as follows:
    res_id0=vcm_reserve(vcm_id0, SIZE__16 MB);
    res_id1=vcm_reserve(vcm_id1, SIZE__16 MB);
    physmem_id_shared=vcm_phys_alloc(VCM_MEM-TYPE0, SIZE__16 MB, 0);
    vcm_back(res_id0, physmem_id_shared);
    vcm_back(res_id1, physmem_id_shared);

The first two calls create 16 MB virtual address ranges, the vcm_phys_alloc( ) call creates a matching 16 MB physical allocation using possible discontinuous blocks of varying sizes. Each vcm_back( ) call will map their virtual spaces to the same physically disjoint physical space.

VCM Region Bounding

Many embodiments also support VCM region subdivision. VCM region subdivision marks off a range of the VCM region and allows users to allocate from that range. It also allows users to query the range. The subdivision API may be:

bound_id=vcm_create_bound(vcm_id, len);
    res_id=vcm_reserve_from_bound(bound_id, len, attr);

In many implementations, vcm_reserve_from_bound( ) function returns a regular res_id. Two utility functions have been provided to return the virtual address and the length of the boundary given a bound_id shown here:

bound_addr=vcm_get_bound_start_addr(bound_id);
    bound_len=vcm_get_bound_len(bound_id);

To remove a bounding a user may call vcm_rm_bound( ) shown here:

ret=vcm_free_bound(bound_id);

This removes a bound_id. The res_id's allocated in the bound_id are not affected (they are still res_id's, they've just been reserved from a boundary, the boundary doesn't control them beyond that). vcm_rm_bound( ) returns 0 on success and non 0 on failure.

Low Level VCM Region Control

A vcm_map_phys_addr( ) function may be used to create a res_id from a contiguous physical address region of len. And it may be called as follows:

res_id=vcm_map_phys_addr(res_id, vcm_id, cont_phys, len);

This call doesn't reserve, it simply maps. cont_phys is a contiguous physical address to be mapped into a virtually contiguous block. Pass a 0 res_id to start a res_id.

Return a res_id's physical addresses with:
    phys=vcm_get_next_phys_addr(res_id, phys, &len);
Return a res_id's device address with:
    devaddr=vcm_get_dev_addr(res_id);

If the res_id was created from an IOMMU VCM region this will return an IOMMU virtual address. If the res_id was created from a CPU VCM region (also referred to herein as a VMM virtual space) it will return the CPU virtual address. If the res_id was created from a one-to-one mapped device VCM region, vcm_get_dev_addr( ) will return a physical address. For portability, vcm_get_dev_addr( ) may be used. vcm_get_dev_addr( ) returns 0 on failure.

To return the res_id from a device address and a VCM call:
    res_id=vcm_get_res(dev_addr, vcm_id);

A frequently needed calculation is to derive the device address from a VCM region that maps the same physical memory as a device address from another VCM region. This is called translating. It is done with vcm_translate( ):
    dst_devaddr=vcm_translate(src_devaddr, src_vcm_id, dst_vcm_id);

Return the res_ids that map a physaddr (reverse lookup) with:
    ret=vcm_get_next_phys_res(phys, res_id, &len);
vcm_get_next_phys_res( ) returns 0 on success and non 0 on failure. Set phys equal to 0 to return the next phys address.

Return the physical address of a VCM region's underling page table with:
    vcm_map_phys_addr_addr=vcm_get_pgtbl_pa(vcm_id);
    vcm_get_pgtbl_pa( ) returns 0 on failure.

To perform a test lookup of a device address call:
    phys=vcm_dev_addr_to_phys_addr(dev_id, dev_addr);
This function will actually request a device lookup of a device address. This function returns 0 on failure.

Low Level Device Control

Normally a page table miss is handled by the framework. Users can override the default handling with:
    ret=vcm_hook(dev_id, user_handler, void*data);

This allows a handler to be mapped to a dev_id. vcm_hook( ) returns 0 on success and non 0 on failure. It is the responsibility of the handler to deal with all aspects of a fault. vcm_hook( ) returns 0 on success and non 0 on failure. The handler should be defined as:
    ret=user_handler(dev_id, void*data, void*fault_data);
The handler will receive the dev_id, the private data pointer passed to vcm_hook( ) and a pointer to general fault_data. The fault_data content is implementation specific. The handler should return 0 if it fails. It the user_handler returns 0 the default handler will run. If it returns anything else the default handler will not run.

The hardware version can be found with:
    hw_version=vcm_hw_ver(dev_id);
This returns 0 on failure.

Complete Call Walkthrough

The following call sequence walks through a typical allocation sequence. In the first stage the memory for a device is reserved and backed. This occurs without mapping the memory into the CPU's VCM region. The second stage maps the first VCM region into the CPU's VCM region so the CPU can read or write it. The second stage is not necessary if the CPU does not need to read or modify the contents of the original mapping.

Stage 1: Map and Allocate Memory for a Device

The call sequence starts by creating a VCM region.
    vcm_id=vcm_create(0, 3_GB);

The next call associates a VCM region with a device:
    avcm_id=vcm_assoc(vcm_id,
    dev_id,
    VCM_USE_LOW_BASE|VCM_DEV_ATTR_VALID);

To activate an association users call vcm_activate( ) on the avcm_id from the associate call. This programs the underlining device with the mappings.
    ret=vcm_activate(avcm_id);

Once a VCM region is created and associated it can be reserved from.
    res_id=vcm_reserve(vcm_id, len,
        VCM_SET_READ|VCM_SET_WRITE|VCM_SET_
        USER|VCM_CACHED_WB_WA);

To physically back a reservation, allocate the physical backing:
    physmem_id=vcm_phys_alloc(VCM_MEMTYPE0, len, VCM_ALL);

To connect a reservation and a physical backing call:
    vcm_back(res_id, physmem_id);

Stage 2: Map the Device's Memory into the CPU's VCM Region

In this example the CPU needs to read and/or write the region that was just created.

The first call uses an OS specific function to generate a vcm_id from the kernel's virtual memory space. Every OS will need to implement this function. If the external VCM region id came from a user process a function generating a VCM region id from the target processes' virtual memory space would be called.
    ext_vcm_id_1=os_specific_map_kernel_space_to_id( );
The next call maps the generated vcm_id, ext_vcm_id_1, into a vcm_id2. Since the VCM region was created by the OS's virtual memory manager, it is 'prebuilt' and vcm_from_prebuilt( ) just overlays an vcm_id abstraction.
    vcm_id2=vcm_from_prebuilt(ext_vcm_id_1);
In the unified API the CPU is cast into the VCM region API by treating it like it's a device with an IOMMU. The only difference between a CPU/MMU and a device/IOMMU is the presence of a virtual memory manager on the CPU. This call will produce an avcm_id_cpu_1 that will need to be activated to uphold the abstraction.

avcm_id_cpu_1=vcm_assoc(vcm_id, dev_id_cpu_1, ...);
vcm_activate(avcm_id_cpu_1);

Once the topology has been setup a vcm_back( ) allows the CPU to read the memory (using the physmem_id generated above).

vcm_back(res_id_cpu_1, physmem_id);

Handling Devices that Gain an IOMMU without Code Changes

Two systems may have a device that has an IOMMU in one system but not in another. The code to manage these cases will not change as long as the parameters are chosen carefully to work in both instances. Here are some examples of this.

A virtual VCM region and the one-to-one VCM region are both included in the 0 to 3_GB range which allows vcm_create( ) to work in both cases:

vcm_id=vcm_create(0, 3_GB);

Since the dev_id knows whether the device has an IOMMU or not vcm_assoc( ) works in both cases. The dev_id mechanism allows the code to remain the same.

avcm_id=vcm_assoc(vcm_id, dev_id, VCM_USE_LOW_BASE|VCM_DEV_ATTR_VALID);

vcm_activate( ) works in both cases because it operates on a avcm_id which knows whether its been bound to a device that has an IOMMU or not.

ret=vcm_activate(avcm_id);

vcm_reserve( ) and vcm_back( ) also work without modification. vcm_reserve( ) selects whether the device addresses we're going to use are virtual or physical based on the dev_id association from vcm_assoc( ), and vcm_back( ) works the same since its only connecting physical pages to virtual pages for the device addresses that vcm_reserve( ) has created and vcm_phys_alloc( ) has allocated.

res_id=vcm_reserve(vcm_id, len, VCM_SET_READ|
VCM_SET_WRITE|
VCM_SET_USER|
VCM_CACHED_WB_WA);
physmem_id=vcm_phys_alloc(VCM_MEMTYPE0, len, VCM_ALL);
vcm_back(res_id, physmem_id);

Finally, when users need a device address they may call vcm_device_addr( ). This function will return a virtual IOMMU address if it's passed a res_id that's associated with an IOMMU space, a physical address if it's passed a res_id that's associated with a one-to-one mapped device and a MMU address if it's passed a res_id that's associated with a CPU's MMU.

devaddr=vcm_device_addr(res_id);

PMEM, IOMMU and CPU Interoperation Example Code

Figure 6:
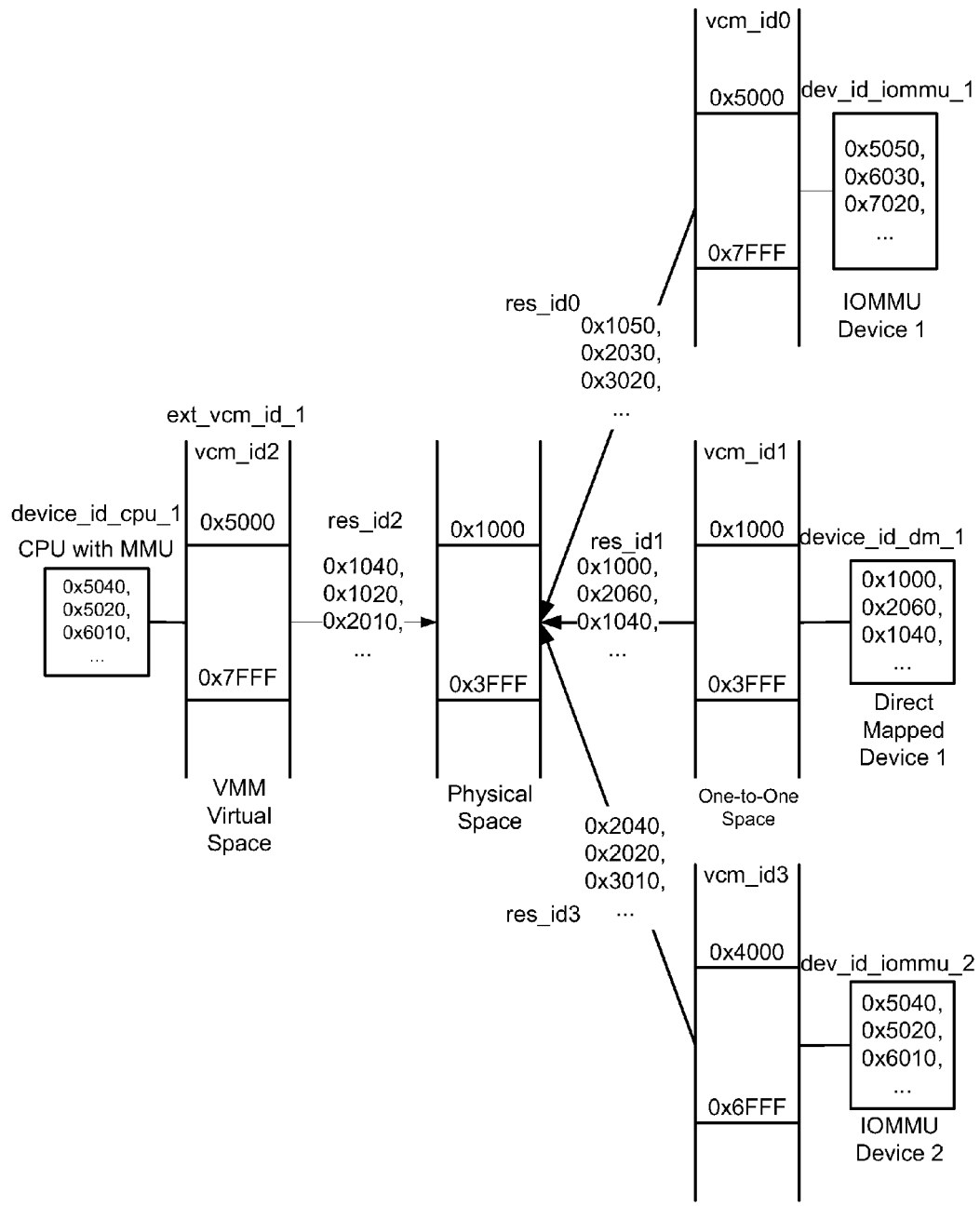
FIG. 6 is a diagram depicting and exemplary mapping of IOMMU, one-to-one, and VMM reservations.

Referring next to FIG. 6, it is a diagram depicting and exemplary mapping of IOMMU, one-to-one, and VMM reservations, and the following is the call sequence associated with the exemplary mapping:

physmem_id=vcm_phys_alloc( ... );
vcm_id0=vcm_create(0x5000, 0x3000);
vcm_id1=vcm_create(0x1000, 0x3000);
vcm_id2=vcm_from_prebuit(ext_vcm_id_1);
vcm_id3=vcm_create(0x4000, 0x3000);
avcm_id_iommu_1=vcm_assoc(vcm_id0, dev_id_iommu_1, ...);
avcm_id_dm_1=vcm_assoc(vcm_id1, dev_id_dm_1, ...);
avcm_id_cpu_1=vcm_assoc(vcm_id2, dev_id_cpu_1, ...);
avcm_id_iommu_2=vcm_assoc(vcm_id3, dev_id_iommu_2, ...);
vcm_activate(avcm_id_iommu_1);
vcm_activate(avcm_id_dm_1);
vcm_activate(avcm_id_cpu_1);
vcm_activate(avcm_id_iommu_2);
res_id_iommu_1=vcm_reserve(vcm_id0, ...);
res_id_dm_1=vcm_reserve(res_id_iommu_1, ...);
res_id_cpu_1=vcm_reserve(res_id_iommu_1, ...);
res_id_iommu_2=vcm_reserve(res_id_iommu_1, ...);
vcm_back(res_id_iommu_1, physmem_id);
vcm_back(res_id_dm_1, physmem_id);
vcm_back(res_id_cpu_1, physmem_id);
vcm_back(res_id_iommu_2, physmem_id);

Exemplary APIs include:

vcm_id=vcm_create(offset, len);
start_addr=vcm_get_start_addr(vcm_id);
len=vcm_get_len(vcm_id);
vcm_free(vcm_id);
vcm_id=vcm_create_from_prebuilt(ext_vcm_id);
new_vcm_id=vcm_clone(vcm_id);
res_id=vcm_reserve(vcm_id, len, attr);
ret=vcm_set_res_attr(res_id, attr);
attr=vcm_get_res_attr(res_id);
min_size=vcm_get_min_page_size( );
res_id=vcm_reserve_at(memtarget, vcm_id, len, attr);
ret=vcm_unreserve(res_id);
res_id=vcm_get_next_res(vcm_id, res_id);
num_res=vcm_get_num_res(vcm_id);
vcm_id=vcm_get_vcm_from_res(res_id);
len=vcm_get_res_len(res_id);
int=vcm_set_res_attr(res_id, attr);
attr=vcm_get_res_attr(res_id);
ret=vcm_res_copy(to, to_off, from, from_off len);
ret=vcm_back(res_id, physmem_id);
ret=vcm_unback(res_id);
physmem_id=vcm_phys_alloc(memtype, len, attr);
ret=vcm_phys_free(physmem_id);
memtype=vcm_get_memtype_of_physalloc(physmem_id);
avcm_id=vcm_assoc(vcm_id, dev_id, attr);
ret=vcm_deassoc(avcm_id);
ret=vcm_set_dev_attr(avcm_id, attr);
attr=vcm_get_dev_attr(avcm_id);
ret=vcm_activate(avcm_id);
ret=vcm_deactivate(avcm_id);
ret=vcm_is_active(avcm_id);
bound_id=vcm_create_bound(vcm_id, len);
res_id=vcm_reserve_from_bound(bound_id, len, attr);
bound_addr=vcm_get_bound_start_addr(bound_id);
bound_len=vcm_get_bound_len(bound_id);
ret=vcm_free_bound(bound_id);
res_id=vcm_map_phys_addr(res_id, vcm_id, cont_phys, len);
phys=vcm_get_next_phys_addr(res_id, phys, &len);
devaddr=vcm_get_dev_addr(res_id);
res_id=vcm_get_res(dev_addr, vcm_id);
dst_devaddr=vcm_translate(src_devaddr, src_vcm_id, dst_vcm_id);
ret=vcm_get_next_phys_res(phys, res_id, &len);
vcm_map_phys_addr_addr=vcm_get_pgtbl_pa(vcm_id);
phys=vcm_dev_addr_to_phys_addr(dev_id, dev_addr);
ret=vcm_hook(dev_id, user_handler, void*data);
ret=user_handler(dev_id, void*data, void*fault_data);
hw_version=vcm_hw_ver(dev_id);

In conclusion, embodiments of the present invention provide, among other things, a unified memory manager that can handle devices with MMUs, CPUs with and without MMUs and devices without MMUs. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for managing memory of a computing device including:
   mapping an address from an address space of a physically-mapped device without a memory management unit (MMU) to a first address of a common address space so as to create a first mapping instance that is a one-to-one mapping between the address from the address space of the physically-mapped device and the address of the common address space, wherein the common address space is composed of a set of addresses that can be read from, and written to, by the physically-mapped device, a processor with a memory management unit, and an MMU device with a memory management unit;
   encapsulating an existing processor mapping that maps an address from an address space of the processor to a second address of the common address space to create a second mapping instance;
   creating a third mapping instance between an address from an address space of the memory-management-unit (MMU) device and a third address of the common address space, wherein the first, second, and third addresses of the common address space may be the same address or different addresses; and
   manipulating the first, second, and third mapping instances using the same function calls.

2. The method of claim 1, wherein mapping an address from an address space of a physically-mapped device to a first address of a common address space includes:
   creating a virtual contiguous memory (VCM) region for the physically-mapped device using a start address and length that is coincident with physical memory so as to create a one-to-one VCM region;
   associating the one-to-one VCM region with the physically-mapped device so as to create an associated-VCM region for the physically-mapped device;
   reserving a portion of the VCM region for the physically-mapped device so as to create an identifiable reservation;
   backing the identifiable reservation so as to create the first mapping instance.

3. The method of claim 1, wherein encapsulating the existing processor mapping includes:
   creating a virtual contiguous memory (VCM) region for the processor using a start address and a length that is obtained from a virtual memory manager of the computing device;
   associating the VCM region with the processor to create an associated-VCM region for the processor;
   activating the associated-VCM region for the processor;
   reserving a portion of the VCM region for the processor so as to create an identifiable reservation for the processor; and
   backing the identifiable reservation so as to create the second mapping instance.

4. The method of claim 1, wherein creating a third mapping instance includes:
   creating a virtual contiguous memory (VCM) region for the MMU device using an arbitrary start address and arbitrary length;
   associating the VCM region to the MMU device to create an associated-VCM region for the MMU device;
   activating the associated-VCM region for the MMU device;
   reserving a portion of the VCM region for the MMU device so as to create an identifiable reservation for the MMU device; and
   backing the identifiable reservation for the MMU device so as to create the third mapping instance.

5. A computing apparatus including:
   physical memory;
   at least one processing device with a memory management unit;
   a plurality of devices including a physically-mapped device without a memory management unit (MMU);
   a bus coupled to the physical memory, the at least one processing device and the plurality of devices;
   a VCM create component configured to create virtual memory instances for the plurality of devices that are available to any function;
   a VCM create from prebuilt component configured to create a virtual memory instance from an existing virtual memory instance;
   a VCM associate component configured to create an associated virtual memory instance from any selected virtual memory instance and any one of the at least one processing device and plurality of devices that correspond to the selected virtual memory instance;
   a VCM activate component configured to activate the virtual memory instances;
   a VCM reserve component that is configured to reserve all, or portions, of any of the virtual memory instances so as to produce reservation instances; and
   a VCM back component that is configured to create mappings between each of the reservation instances and instances that represent multiple physical memory instances that represent multiple bus addresses.

6. The apparatus of claim 5, wherein the plurality of devices includes at least one physically-mapped device and at least one memory-management-unit (MMU) device.

7. The apparatus of claim 6, wherein the VCM create component is configured to create a virtual memory instance for the physically-mapped device using a start address and a length that is coincident with a portion of the physical memory so as to create a one-to-one VCM region.

8. The apparatus of claim 7, wherein the VCM create component is configured to create a virtual memory instance for the MMU device using an arbitrary start address and length.

9. The apparatus of claim 5, wherein the VCM create from prebuilt component is configured to obtain a start address and length from a virtual memory manager that manages memory mappings for the at least one processing device.

10. A computing apparatus, comprising:
    physical memory;
    at least one processing device with a memory management unit (MMU);
    at least one physically-mapped device without an MMU;
    at least one MMU device with a memory management unit;
    a bus coupled to the physical memory, the at least one processing device, the at least one physically-mapped device, and the at least one MMU device;
    means for mapping an address from an address space of the at least one physically-mapped device to a first address of a common address space so as to create a first mapping instance that is a one-to-one mapping between the address from the address space of the at least one physically-mapped device and the address of the common address space, wherein the common address space is composed of a set of addresses that can be read from, and written to, by the at least one processing device, the at least one physically-mapped device, and the at least one MMU device with a memory management unit;

means for encapsulating an existing processor mapping that maps an address from an address space of the at least one processing device to a second address of the common address space to create a second mapping instance;

means for creating a third mapping instance between an address from an address space of the at least one MMU device and a third address of the common address space, wherein the first, second, and third addresses of the common address space may be the same address or different addresses; and means for manipulating the first, second, and third mapping instances using the same function calls.

11. The apparatus of claim 10, wherein the means for mapping an address from an address space of the at least one physically-mapped device to a first address of a common address space includes:

means for creating a virtual contiguous memory (VCM) region for the at least one physically-mapped device using a start address and length that is coincident with physical memory so as to create a one-to-one VCM region;

means for associating the one-to-one VCM region to the at least one physically-mapped device so as to create an associated-VCM region for the physically-mapped device;

means for reserving a portion of the VCM region for the at least one physically-mapped device so as to create an identifiable reservation;

means for backing the identifiable reservation so as to create the first mapping instance.

12. The apparatus of claim 10, wherein the means for encapsulating the existing processor mapping includes:

means for creating a virtual contiguous memory (VCM) region for the at least one processing device using a start address and a length that is obtained from a virtual memory manager of the computing apparatus;

means for associating the VCM region to the at least one processing device to create an associated-VCM region for the at least one processing device;

means for activating the associated-VCM region for the at least one processing device;

means for reserving a portion of the VCM region for the at least one processing device so as to create an identifiable reservation for the at least one processing device; and means for backing the identifiable reservation so as to create the second mapping instance.

13. The apparatus of claim 10, wherein the means for creating a third mapping instance includes:

means for creating a virtual contiguous memory (VCM) region for the at least one MMU device using an arbitrary start address and arbitrary length;

means for associating the VCM region to the at least one MMU device to create an associated-VCM region for the at least one MMU device;

means for activating the associated-VCM region for the at least one MMU device;

means for reserving a portion of the VCM region for the at least one MMU device so as to create an identifiable reservation for the at least one MMU device; and means for backing the identifiable reservation for the at least one MMU device so as to create the third mapping instance.

14. A non-transitory, tangible computer readable storage medium, encoded with processor readable instructions to perform a method for managing memory of a computing device, the method comprising:

mapping an address from an address space of a physically-mapped device without a memory management unit (MMU) to a first address of a common address space so as to create a first mapping instance that is a one-to-one mapping between the address from the address space of the physically-mapped device and the address of the common address space, wherein the common address space is composed of a set of addresses that can be read from, and written to, by the physically-mapped device, a processor with a memory management unit, and an MMU device with a memory management unit;

encapsulating an existing processor mapping that maps an address from an address space of the processor to a second address of the common address space to create a second mapping instance;

creating a third mapping instance between an address from an address space of the MMU device and a third address of the common address space, wherein the first, second, and third addresses of the common address space may be the same address or different addresses; and manipulating the first, second, and third mapping instances using the same function calls.

15. The non-transitory, tangible computer readable storage medium of claim 14, wherein mapping an address from an address space of a physically-mapped device to a first address of a common address space includes:

creating a virtual contiguous memory (VCM) region for the physically-mapped device using a start address and length that is coincident with physical memory so as to create a one-to-one VCM region;

associating the one-to-one VCM region to the physically-mapped device so as to create an associated-VCM region for the physically-mapped device;

reserving a portion of the VCM region for the physically-mapped device so as to create an identifiable reservation;

backing the identifiable reservation so as to create the first mapping instance.

16. The non-transitory, tangible computer readable storage medium of claim 14, wherein encapsulating the existing processor mapping includes:

creating a virtual contiguous memory (VCM) region for the processor using a start address and a length that is obtained from a virtual memory manager of the computing device;

associating the VCM region for the processor to the processor to create an associated-VCM region for the processor;

activating the associated-VCM region for the processor;

reserving a portion of the VCM region for the processor so as to create an identifiable reservation for the processor; and backing the identifiable reservation so as to create the second mapping instance.

17. The non-transitory, tangible computer readable storage medium of claim 14, wherein creating a third mapping instance includes:

creating a virtual contiguous memory (VCM) region for the MMU device using an arbitrary start address and arbitrary length;

associating the VCM region for the MMU device to the MMU device to create an associated-VCM region for the MMU device;

activating the associated-VCM region for the MMU device;

reserving a portion of the VCM region for the MMU device so as to create an identifiable reservation for the MMU device; and backing the identifiable reservation for the MMU device so as to create the third mapping instance.

* * * * *